United States Patent
Jain (10) Patent No.: US 9,312,725 B2
(45) Date of Patent: Apr. 12, 2016

(54) SYSTEM AND METHOD FOR EFFICIENT POWER DISTRIBUTION AND BACKUP

(71) Applicant: AiNET Registry, LLC, Beltsville, MD (US)

(72) Inventor: Deepak K. Jain, Beltsville, MD (US)

(73) Assignee: AINET REGISTRY, LLC, Beltsville, MD (US)

( * ) Notice: Subject to any disclaimer, the term of this patent is extended or adjusted under 35 U.S.C. 154(b) by 306 days.

(21) Appl. No.: 13/945,648

(22) Filed: Jul. 18, 2013

(65) Prior Publication Data
US 2014/0054966 A1 Feb. 27, 2014

Related U.S. Application Data

(63) Continuation-in-part of application No. 13/594,533, filed on Aug. 24, 2012.

(51) Int. Cl.
*H02J 9/00* (2006.01)
*H02J 3/46* (2006.01)
*H02J 9/06* (2006.01)
*H02J 1/00* (2006.01)

(52) U.S. Cl.
CPC ... *H02J 9/00* (2013.01); *H02J 3/46* (2013.01); *H02J 9/062* (2013.01); *Y10T 307/62* (2015.04)

(58) Field of Classification Search
CPC .................................................... H02J 1/00
USPC ......................................................... 307/43
See application file for complete search history.

(56) References Cited

U.S. PATENT DOCUMENTS

| | | | |
|---|---|---|---|
| 5,881,215 A | 3/1999 | Alft | |
| 7,962,772 B2 | 6/2011 | Jain | |
| 2003/0184160 A1* | 10/2003 | Yamamoto | 307/64 |
| 2005/0200205 A1 | 9/2005 | Winn et al. | |
| 2006/0167569 A1 | 7/2006 | Colombi et al. | |
| 2006/0290205 A1 | 12/2006 | Heber et al. | |
| 2007/0217125 A1 | 9/2007 | Johnson | |
| 2008/0211308 A1 | 9/2008 | Lin et al. | |
| 2009/0033153 A1 | 2/2009 | Linkhart et al. | |
| 2009/0055031 A1 | 2/2009 | Slota et al. | |
| 2012/0026764 A1* | 2/2012 | Giuntini et al. | 363/69 |

FOREIGN PATENT DOCUMENTS

| | | |
|---|---|---|
| EP | 1833138 A2 | 9/2007 |
| KR | 2013 0036823 A | 4/2013 |
| WO | 01/61824 A1 | 8/2001 |

OTHER PUBLICATIONS

Three Phase Uninterruptible Power Supplies (UPS) Information, GlobalSpec.com, obtained from url: <http://www.globalspec.com/learnmore/electrical_electronic_components/power_supplies_conditioners/ups_uninterruptible_power_supply_three_phase> on May 9, 2012.

(Continued)

*Primary Examiner* — Robert Deberadinis
(74) *Attorney, Agent, or Firm* — Pillsbury Winthrop Shaw Pittman, LLP (57) ABSTRACT

A system and method of power distribution and backup is provided. The power backup system includes a first uninterruptible power supply and a second uninterruptible power supply configured to drive a load in parallel. The first uninterruptible power supply and the second uninterruptible power supply are both connected through a direct connection or through at least two switches to at least two power sources.

17 Claims, 4 Drawing Sheets

(56) References Cited

OTHER PUBLICATIONS

Uninterruptible Power Supply, Wikipedia, obtained from url: <http://en.wikipedia.org/wiki/Uninterruptible_power_supply> on May 9, 2012.
UPS External Maintenance Bypass, Instructional eGuide Series, Computer Air/Power Systems, Mar. 26, 2010, obtained from url: <http://www.caps4ups.com/content/CAPS-Bypass-eGuide.pdf>.
Power Xpert 9395 Backup Power System, Eaton Corporation, obtained from url: <http://powerquality.eaton.com/Products-services/Backup-Power-UPS/9395.aspx?cx=3> on Apr. 9, 2012.
Intl Search Report/Written Opinion dated Oct. 10, 2013 of corresponding PCT/US2013/054003 filed Aug. 7, 2013 (14 pages).
International Search Report/Written Opinion dated Oct. 29, 2014 of PCT/US2014/046729 filed Jul. 15, 2014 (17 pgs.).
Rahmat, M. K., et al., Uninterruptible Power Supply (UPS) System Configurations: Reliability Comparison, IEEE International Conf. on Power and Energy (2010).
"Using Static Transfer Switches to Enhance Data Center Availability and Maintainability", A Technical Note from the Experts in Business-Critical Continuity (TM) (2010) Retrieved from Internet: URL:http://www.emersonnetworkpower.com/documentation/en-us/brands/liebert/documents/white%20papers/using%20static%20transfer%2)switches%20to%20enhance%20data%20center%20avilability%20and%20maintainability.pdf [retrieved on Oct. 15, 2014].
Non-final Office Action dated Aug. 29, 2014 of U.S. Appl. No. 13/594,533, filed Aug. 24, 2014 (16 pages).
Written Opinion of the International Preliminary Examining Authority dated Oct. 2, 2015 for Appln. No. PCT/US2014/046729.
International Preliminary Report on Patentability dated Jan. 7, 2016 for Appln. No. PCT/US2014/046729.

* cited by examiner

SYSTEM AND METHOD FOR EFFICIENT POWER DISTRIBUTION AND BACKUP

CROSS-REFERENCE TO RELATED APPLICATIONS

This application is a continuation-in-part (CIP) application under 35 U.S.C §120 of co-pending U.S. patent application Ser. No. 13/594,533, filed Aug. 24, 2012, the entire contents of which are incorporated herein by reference.

BACKGROUND

Field

This application is directed generally to power distribution and backup systems, and specifically to uninterrupted power supply systems.

Conventional uninterrupted power supply systems require active components, e.g., an active switch, between a mains power source or a generator and an input inlet of the individual uninterrupted power supply systems. Such active switches or components are expensive, have to be predetermined for each such system, and are not linearly scalable to additional loads powered by the uninterrupted power supply system. In the event of failure of such active components, the power supply system has to be taken offline for repair, which results in downtime of the power supply system. Further, such active components require synchronization of the power being supplied to the uninterrupted power supply systems' respective inputs to drive loads using synchronized power at respective outputs. These active components may require synchronization of input feeders from utility as well, leading to higher costs, higher losses (inefficiencies), and more failure modes.

The present disclosure provides improvements over prior art uninterrupted power supply systems.

SUMMARY

Among other things, this disclosure provides embodiments of a power backup system. The power backup system includes a first uninterruptible power supply and a second uninterruptible power supply configured to drive a load in parallel. The first uninterruptible power supply and the second uninterruptible power supply are both connected through a direct connection to at least two power sources.

In one embodiment, an uninterrupted power supply system is provided. The uninterrupted power supply system includes a first uninterrupted power supply (UPS), a second UPS connected electrically parallel to the first UPS, a third UPS, and a fourth UPS connected electrically parallel to the third UPS. At least one of the first, the second, the third, and the fourth UPSs include at least two input inlets to directly receive power supply from at least two independent power sources without an active component in between the two independent power sources and the first, the second, the third, and the fourth UPSs, such that the first, the second, the third, and the fourth UPSs supply uninterrupted power to a load.

In another embodiment, a method for providing power backup is provided. The method includes coupling at least two uninterrupted power supplies (UPSs) directly to at least two independent power sources such that each of the at least two UPSs receives power from the at least two independent power sources. The method includes providing, from the at least two UPSs, uninterrupted power to a load connected in parallel to the at least two UPSs, wherein upon a failure of one of the at least two independent power sources, the other power source continues supplying power to the at least two UPSs for the providing.

In yet another embodiment, an uninterrupted power supply system is provided. The uninterrupted power supply system includes a first UPS, a second UPS connected electrically parallel to the first UPS, a third UPS, and a fourth UPS connected electrically parallel to the third UPS. At least one of the first, the second, the third, and the fourth UPSs include at least two input inlets connected to at least two switches to receive power supply from at least two independent power sources. Each of the at least two switches may be connected with the two independent power sources without an active component in between the switch and the power sources. At least one of the at least two switches may be a three-phase sensing switch. The first, the second, the third, and the fourth UPSs supply uninterrupted power to a load.

In a further embodiment, a method for providing power backup is provided. The method includes coupling at least two uninterrupted power supplies (UPSs) to at least two independent power sources through a first switch and a second switch such that each of the at least two UPSs receives power from the at least two independent power sources. The method further includes providing uninterrupted power to a load from the at least two UPSs, the load being connected in parallel to the at least two UPSs. Upon a failure of one of the at least two independent power sources, the other power source continues supplying power to the at least two UPSs for providing uninterrupted power to the load. At least one of the first and second switches may be a three-phase sensing switch.

DETAILED DESCRIPTION

Figure 1:
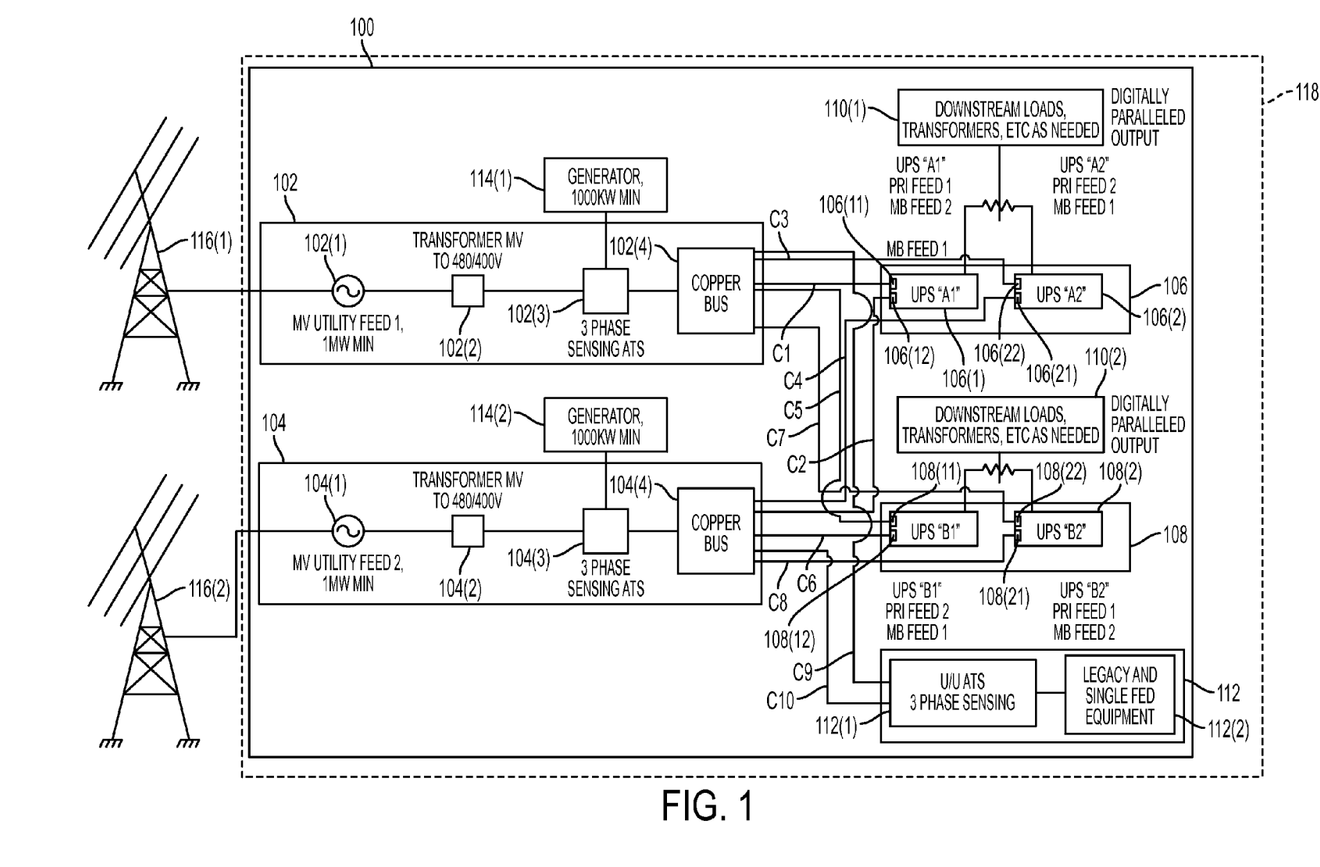
FIG. 1 illustrates a schematic block diagram of a power backup system, in accordance with an embodiment.

FIG. 1 provides a schematic block diagram of an exemplary embodiment of a power backup system 100. Power backup system 100 may include a first power source 102, a second power source 104, a first pair or set of uninterruptible power supplies 106, a second pair or set of uninterruptible power supplies 108, a first load 110(1), a second load 110(2), a first generator 114(1), and a second generator 114(2), although power backup system 100 may include more or lesser number of components. For example, in one embodiment, power backup system 100 may include only first pair of uninterruptible power supplies 106 without second pair of uninterruptible power supplies 108, only one load, or three or more loads. Power backup system 100 includes connections C1-C8 that electrically couple first power source 102 and second power source 104 to first pair of uninterruptible power supplies 106 and second pair of uninterruptible power supplies 108 in the exemplary manner illustrated in FIG. 1. In addition, first power source 102 and second power source 104 are electrically coupled to a legacy load 112 via electrical connections C9 and C10, respectively. In one embodiment, power backup system 100 includes a generator 114(1) coupled to first power source 102 and generator 114(2) coupled to second power source 104. Electrical power provided by power source 102, power source 104, or both is used by first pair of uninterruptible power supplies 106, second pair of uninterruptible power supplies 108, or both, and generators 114(1) or 114(2), or both, to drive one or more loads, e.g., load 110(1) and/or load 110(2) coupled at respective output terminals (not shown) of first pair of uninterruptible power supplies 106 and second pair of uninterruptible power supplies 108, respectively. The features and functionalities of power backup system 100 may be achieved using fewer or higher number of components than those disclosed herein. For example, one or more of connections C1-C10 may be routed via passive components, e.g., circuit breakers or fuses, and the specific arrangement of components shown in power backup system 100 of FIG. 1 is by way of example only, and not by way of limitation. Also, one or more generators may be coupled as 114 for example, a 2 MW generator may feed two 1 MW capacity switches 102 or conversely, two 600 KW generator fees may be synchronized to feed a single 1 MW 102.

In one embodiment, power backup system may be located inside a building 118, e.g., a data center. In one embodiment, power backup system 100 may be located outside a building. In one embodiment, part of power backup system may be located inside building 118, whereas part of power backup system 100 may be located outside building 118. For example, first and second power sources 102 and 104 may be located outside building 118, and first and second pair of uninterruptible power supplies 106 and 108 may be located inside building 118. Accordingly, various embodiments described herein are not limited by specific location of components of power backup system 100, and the arrangement illustrated in FIG. 1 is by way of example only.

First power source 102 includes an alternating current (AC) mains power source 102(1). AC mains power source 102(1) itself may be coupled at its input to a power grid 116(1) or other power generating facility (not shown), and coupled electrically to a transformer 102(2) at its output. An output of transformer 102(2) may be coupled to an automatic transfer switch (ATS) 102(3). ATS 102(3) includes an inlet (not shown) to receive power from generator 114(1) in an event of a failure of AC mains power source 102(1). An output of ATS 102(3) is further coupled to a bus 102(4). Bus 102(4) outputs power at one or more connections (e.g., connections C1, C3, C5, C7, and C9).

Likewise, second power source 104 includes an alternating current (AC) mains power source 104(1). AC mains power source 104(1) itself may be coupled at its input to a power grid 116(2) or other power generating facility (not shown), and at its output to a transformer 104(2). In one embodiment, AC mains power source 102(1) and AC mains power source 104 (1) may both be coupled to the same power grid 116(1) or 116(2). An output of transformer 104(2) may be coupled to an automatic transfer switch (ATS) 104(3). ATS 104(3) includes an inlet (not shown) to receive power from generator 114(1) in an event of a failure of AC mains power source 104(1). An output of ATS 104(3) is further coupled to a bus 104(4). Bus 104(4) outputs power at one or more connections (e.g., connections C2, C4, C6, C8, and C10). In one embodiment, second power source 104 is independent of first power source 102. Alternatively, second power source 104 may be same as or may be dependent upon first power source 102 for power. In one embodiment, first power source 102 and/or second power source 104 may allow for "net-metering" in which owners of loads 110(1) and 110(2) may receive financial or energy credit for at least a portion of electricity regenerated and supplied back to power grids 116(1) and/or 116(2). In one embodiment, first power source 102 and/or second power source 104 may allow for "peak shaving" that lets power users (e.g., loads 110(1) and/or 110(2)) take advantage of the relatively low cost of utility power during periods of off-peak demand and generate (a portion or all of) their own power during peak periods to avoid high demand charges. In one embodiment, first power source 102 and/or second power source 104 may be in a co-generation mode in coordination with the mains power supplier for cost-savings, energy efficiency, or environmentally friendly "green" applications.

AC mains power source 102(1) may be a power source supplying alternating current at a predetermined voltage and frequency (e.g., in transmission voltage (>115 KV), medium voltage (e.g., 33.4 kV), 480V/60 Hz, 277V/60 Hz, 240V/60 Hz, 120V/60 Hz, or other values) from a utility company, for example. In one embodiment, AC mains power source 102(1) may provide substantially sinusoidal output current with a known quality factor to drive one or more loads, e.g., load 110(1) and/or load 110(2). Likewise, AC mains power source 104(1) has physical structure and characteristics similar to that of AC mains power source 102(1). However, in one embodiment, AC mains power source 104(1) may output current or power that is unsynchronized with respect to an output at AC mains power source 102(1). The term "unsynchronized" relates to output at AC mains power source 102(1) and AC mains power source 104(1) being substantially out of phase, substantially out of frequency, substantially out of amplitude, or combinations thereof, with each other. For example, an output phase of AC mains power source 102(1) may be substantially different from an output phase of AC mains power source 104(1). For example, when respective phases of output waveforms at AC mains power source 102(1) and AC mains power source 104(1) are outside a predetermined window of tolerance, the two phases are deemed as unsynchronized. In an alternative embodiment, current or power output from AC mains power source 102(1) and AC mains power source 104(1) may be synchronized. For example, when respective phases, frequencies, amplitudes, or combinations thereof, of AC mains power source 102(1) and AC mains power source 104(1) are within the predetermined window of tolerance of each other, the outputs are deemed as "synchronized." In one embodiment, AC mains power source 102(1) and AC mains power source 104(1) may be supplied synchronized power by the utility power provider. In one embodiment, such synchronization may be achieved without using a paralleling board or a switch board. In one embodiment, output from AC mains power source 102(1) is exactly same as an output from AC mains power source 104(1) for all practical purposes. Specific parametric values of output from each of AC mains power source 102(1) and AC mains power source 104(1) may depend on specific geographical locations where power backup system 100 is implemented. As noted above, AC mains power source 102(1) and AC mains power source 104(1) may be located outside building 118 or in a power/electrical room of building 118 (e.g., a data center). In one embodiment, AC mains power source 102(1) and AC mains power source 104(1) may be replaced by direct current (DC) power sources. By way of example only, and not by way of limitation, AC mains power source 102(1) and AC mains power source 104(1) may provide a minimum of 1 MW power. Furthermore, AC mains power source 102(1) and/or AC mains power source 104(1) may be single phase, dual phase, or three-phase power sources.

In one embodiment, transformers 102(2) and 104(2) may each be step down transformers capable of outputting at a lower voltage than that provided by AC mains power source 102(1) and AC mains power source 104(1), respectively. In one embodiment, transformers 102(2) and 104(2) may each be step up transformers. By way of example only, and not by way of limitation, transformers 102(2) and 104(2) may each provide a step down voltage of 480V, or 400V from a value in MV range. Transformers 102(2) and 104(2) may step-up or step-down voltages to two or more levels, as needs by loads 110(1) and/or 110(2). Typically, the output ranges needed by UPSs 106(1), 106(2), 108(1), and/or 108(2) and/or loads 110(1) and/or 110(2) may be standard voltages such as 480/400/277/240/220/208/120/110V.

ATS 102(3) and ATS 104(3) may be three-phase sensing switches coupled to an output terminal of transformers 102(2) and 104(2), respectively. In one embodiment, ATS 102(3) and ATS 104(3) may be the more common, and less expensive single-phase sensing switches. In addition, ATS 102(3) and ATS 104(3) may each receive power from generators 114(1) and 114(2), respectively, in the event that one or more of AC mains power source 102(1) and AC mains power source 104(1) fail or under perform. For example, in addition to transferring a load (e.g., load 110(1)) to generators 114(1) and 114(2), ATS 102(3) and ATS 104(3) also command generators 1104(1) and 114(2), respectively, to start, based on the voltage monitored on the primary supply (e.g., AC mains power sources 102(1) and 104(1)). ATS 102(3) and ATS 104(3) also isolate generators 114(1) and 114(2), respectively, from the electric utility, when generators 114(1) and 114(2) are on and are providing temporary power. The control capability of ATS 102(3) and ATS 104(3) may be manual only, or a combination of automatic and manual. For example, a controller or processor inside ATS 102(3) and ATS 104(3) may continuously, or at preprogrammed time intervals, monitor various quality factors associated with AC mains power source 102(1), generator 114(1), AC mains power source 104(1), and/or generator 114(2), respectively, and make a decision to connect/disconnect one or more of AC mains power source 102(1), generator 114(1), AC mains power source 104(1), and/or generator 114(2) to provide high or acceptable quality of power to buses 102(4) and 104(4). Likewise, ATS 102(3) and ATS 104(3) may be operated by a human operator who monitors power quality of output from AC mains power source 102(1), generator 114(1), AC mains power source 104(1), and/or generator 114(2) and selects the best ones amongst them. Further, such monitoring may be performed remotely in a control room where power quality parameters are computed at ATS 102(3) and ATS 104(3) but analyzed and displayed in the control room by computers, and provided to human operators for decision making In one embodiment, ATS 102(3) and ATS 104(3) may have a logic controller implemented using a processor and a memory therein to condition output therefrom. Such conditioning may include, but is not limited to, noise filtering, smoothing, distortion reduction, and analog or digital signal processing performed on inputs to ATS 102(3) and ATS 104(3) prior to outputting.

Generators 114(1) and 114(2) may be for example, 1 MW minimum rating generators, although specific ratings of generators 114(1) and 114(2) will depend on current drawn by load 110(1) and/or load 110(2). By way of example only, generators 114(1) and 114(2) may be any kind of generators that meet reliability requirements for safe operation of loads 110(1) and 110(2). Typically stationary diesel generators may be used, but mobile, natural gas, propane, steam turbine, or solar generators may be used provided the availability requirements meet the application (loads 110(1) and 110(2)'s) needs. These generators may be used to provide peak shaving and other functions in conjunction with the "uninterruptible" power system. Additionally, it is to be noted that the term "generator" may simply be another utility or other power feeder, chosen to meet the requirements of the system or the specific application. There is no requirement that "generator" need to be standby or emergency power and instead may be primary "utility" power as well, though for reliability purposes, generators 114(1) and 114(2) may be completely different power feeds than power feeds of either AC mains power source 102(1) or AC mains power source 104(1).

The output power from ATS 102(3) and ATS 104(3) is provided to connections C1-C10 via buses 102(4) and 104(4), respectively, as illustrated in FIG. 1. In one embodiment, buses 102(4) and 104(4) are copper buses, and are passive devices, although other types of buses known to one of ordinary skill in the art may be used. Although only ten output connections C1-C10 are illustrated, higher or lower number of output connections from buses 102(4) and 104(4) may be present depending upon specific applications for which output power from AC mains power source 102(1) and AC mains power source 104(1) is to be used, as may be contemplated by one of ordinary skill in the art after reading this disclosure. For example, in one embodiment, connections C1 and C3 from bus 102(4), and connections C2 and C4 from bus 104(4) connect to and provide power to first pair of uninterruptible power supplies 106. Likewise, connections C5 and C7 from bus 102(4), and connections C6 and C8 from bus 104(4) connect to and provide power to second pair of uninterruptible power supplies 108.

Connections C1-C 10 are physical connections, for example, power cables with appropriate gauge rating to handle power provided by AC mains power source 102(1), generator 114(1), AC mains power source 104(1), and/or generator 114(2). Although, connections C1-C10 form or are direct connections between AC mains power source 102(1), generator 114(1), AC mains power source 104(1), and/or generator 114(2) and first pair of UPSs 106, second pair of UPSs 108, and legacy load 112, in one embodiment connections C1-C10 may be physically routed via passive components such as inductive chokes, circuit breakers, and/or fuses. In one embodiment, connections C1-C10 may be made of copper, however, any power grade material, e.g., Copper-aluminum alloy material, may be used for connections C1-C10.

In one embodiment, first pair of uninterruptible power supplies 106 include a first uninterrupted power supply (UPS) 106(1) and a second UPS 106(2). Each UPS 106(1) and 106(2) may be configured to rectify alternating current (AC) to direct current to drive load 110(1). In one embodiment, when load 110(1) is an alternating current load, such rectification may not be carried out. In one embodiment, input current to UPS 106(1) is provided via connections C1 and C2 to first power source 102 and second power source 104, respectively. Likewise, input current to UPS 106(2) is provided via connections C3 and C4 to first power source 102 and second power source 104, respectively. The input currents received by UPSs 106(1) and 106(2) may be unsynchronized relative to each other. In one embodiment, input current to UPS 106(1) provided via connections C1 and C2, and input current to UPS 106(2) provided by connections C3 and C4 may be synchronized. Regardless of whether the input currents are synchronized or unsynchronized, UPS 106(1) and UPS 106(2) provide a digitally synchronized output current to drive load 110(1). It is to be noted that although two UPSs 106(1) and 106(2) are illustrated, first pair of uninterruptible power supplies 106 may include a higher number of UPSs, in which case the phrase "pair" would no longer be applicable. For example, when first pair of uninterruptible power supplies 106 has three UPSs, it may be referred to as first triplet of uninterruptible power supplies 106, or generally, first set of power supplies 106, and the features and functionalities of the embodiments disclosed herein are not limited by specific numbers of UPSs.

In one embodiment, first UPS 106(1) has a first primary feed 106(11) at a first input inlet thereof, and a first maintenance bypass feed 106(12) at a second input inlet thereof. First primary feed 106(11) is coupled directly to bus 102(4) by connection C1 to receive AC current or power from first power source 102 (e.g., from AC mains power source 102(1) or generator 114(1)) at the first input inlet/terminal of UPS 106(1). First maintenance bypass feed 106(12) is coupled directly to bus 104(4) by connection C2 to receive AC current or power from second power source 104 (e.g., from AC mains power source 104(1) or generator 114(2)) at the second input inlet/terminal of UPS 106(1). As referred to herein, the term "directly" relates to a direct connection between respective components being described, without intermediate active devices (e.g., active switches, panel boards, etc.). For example, as described above, connection C1 forms or is a direct connection between first primary feed 106(11) and bus 102(4). In one embodiment, such direct connections may include passive components in between (e.g., fuses, circuit breakers, breaker panels, etc.) with no substantial active components for switching between buses 102(4) and 104(4) of first power source 102 and second power source 104, respectively.

In one embodiment, second UPS 106(2) has a second primary feed 106(21) at a first input inlet thereof, and a second maintenance bypass feed 106(22) at a second input inlet thereof. Second primary feed 106(21) is coupled directly to bus 104(4) by connection C4 to receive AC current or power from second power source 104 (e.g., from AC mains power source 104(1) or generator 114(2)) at the first input inlet/terminal of UPS 106(2). Second maintenance bypass feed 106(22) is coupled directly to bus 102(4) by connection C3 to receive AC current or power from first power source 102 (e.g., from AC mains power source 102(1) or generator 114(1)) at the second input inlet/terminal of UPS 106(2). It is to be noted that in the arrangement of connections illustrated in FIG. 1, first primary feed 106(11) and second primary feed 106(21) are both directly connected to different power sources, viz., first power source 102 and second power source 104, respectively. Likewise, first maintenance bypass feed 106(12) and second maintenance bypass feed 106(22) are both directly connected to different power sources, viz., second power source 104 and first power source 102, respectively. In one embodiment, such direct connections may include passive components in between (e.g., fuses, circuit breakers, breaker panels, etc.) with no substantial active components for switching between buses 102(4) and 104(4) of first power source 102 and second power source 104, respectively. An output of second UPS 106(2) is connected to load 110(1) with standard impedance matching circuitry in-between (not shown) to drive load 110(1) in parallel with output from first UPS 106(1). In one embodiment, these outputs from first UPS 106(1) and second UPS 106(2) are synchronized (e.g., digitally synchronized).

In one embodiment, second pair of uninterruptible power supplies 108 includes a third UPS 108(1) and a fourth UPS 108(2). Each UPS 108(1) and 108(2) may be configured to rectify alternating current to direct current to drive load 110(2). In one embodiment, when load 110(2) is an alternating current load, such rectification may not be carried out. In one embodiment, input current to UPS 108(1) is provided via connections C5 and C6 to first power source 102 and second power source 104, respectively. Likewise, input current to UPS 108(2) is provided by connections C7 and C8 to first power source 102 and second power source 104, respectively. In one embodiment, input currents received at UPSs 108(1) and 108(2) may be unsynchronized relative to each other. In one embodiment, input current to UPS 108(1) provided by connections C5 and C6, and input current to UPS 108(2) provided by connections C7 and C8 may be synchronized. Regardless of whether the input currents are synchronized or unsynchronized, UPS 108(1) and UPS 108(2) provide a digitally synchronized output current to drive load 110(2). It is to be noted that although two UPSs 108(1) and 108(2) are illustrated, second pair of uninterruptible power supplies 108 may include a higher number of UPSs, in which case the phrase "pair" would no longer be applicable. For example, when second pair of uninterruptible power supplies 108 has three UPSs, it may be referred to as second triplet of uninterruptible power supplies 108, or generally, as second set of uninterruptible power supplies 108, and the features and functionalities of the embodiments disclosed herein are not limited by specific numbers of UPSs.

In one embodiment, third UPS 108(1) has a third primary feed 108(11) at a first input inlet thereof, and a third maintenance bypass feed 108(12) at a second input inlet thereof. Third primary feed 108(11) is coupled directly to bus 102(4) by connection C5 to receive AC current or power from first power source 102 (e.g., from AC mains power source 102(1) or generator 114(1)) at the first input inlet/terminal of third UPS 108(1). Third maintenance bypass feed 108(12) is coupled directly to bus 104(4) by connection C6 to receive AC current or power from second power source 104 (e.g., from AC mains power source 104(1) or generator 114(2)) at the second input inlet/terminal of third UPS 108(1). In one embodiment, such direct connections may include passive components in between (e.g., fuses, circuit breakers, breaker panels, etc.) with no substantial active components for switching between buses 102(4) and 104(4) of first power source 102 and second power source 104, respectively.

In one embodiment, fourth UPS 108(2) has a fourth primary feed 108(21) at a first input inlet thereof, and a fourth maintenance bypass feed 108(22) at a second input inlet thereof. Fourth primary feed 108(21) is coupled directly to bus 104(4) by connection C8 to receive AC current or power from second power source 104 (e.g., from AC mains power source 104(1) or generator 114(2)) at the first input inlet/terminal of fourth UPS 108(2). Fourth maintenance bypass feed 108(22) is coupled directly to bus 102(4) by connection C7 to receive AC current or power from second power source 102 (e.g., from AC mains power source 102(1) or generator 114(1)) at the second input inlet/terminal of fourth UPS 108(2). It is to be noted that in the arrangement of connections illustrated in FIG. 1, third primary feed 108(11) and fourth primary feed 108(21) are both directly connected to different power sources, viz., first power source 102 and second power source 104, respectively. Likewise, third maintenance bypass feed 108(12) and fourth maintenance bypass feed 108 (22) are both directly connected to different power sources, viz., second power source 104 and first power source 102, respectively. In one embodiment, such direct connections may include passive components in between (e.g., fuses, circuit breakers, breaker panels, etc.) with no substantial active components for switching between buses 102(4) and 104(4) of first power source 102 and second power source 104, respectively. In one embodiment, these outputs from third UPS 108(1) and fourth UPS 108(2) are synchronized (e.g., digitally synchronized).

The term "uninterruptible" relates to substantially continuous electricity or power supply from one or more of first UPS 106(1), second UPS 106(2), third UPS 108(1), and/or fourth UPS 108(2) to load 110(1) and/or load 110(2). Further, the term "uninterruptible" may refer to outputting electricity or power from one or more of first UPS 106(1), second UPS 106(2), third UPS 108(1), and/or fourth UPS 108(2) to load 110(1) and/or load 110(2) in a manner that does not disrupt acceptable performance of loads 110(1)-110(n). For example, power output from first UPS 106(1) may, for a period of time, fluctuate. However, as long as such fluctuation does not affect normal operation of load 110(1), output current or power from first UPS 106(1) may still be deemed as "uninterrupted" power supply. The acceptable or normal operation of loads 110(1) and 110(2) may depend on specific application for which loads 110(1) and 110(2) are used, and as such, the definition of such acceptable performance may vary based on specific circumstances. Contrastingly, when power supply becomes discontinuous, or substantially prevents operation of loads 110(1) and 110(2), then such a power output or supply is deemed as "interrupted" or "discontinuous," and is by definition, not uninterruptible. In one embodiment, upon a failure of any two UPSs out of first UPS 106(1), second UPS 106(2), third UPS 108(1), and/or fourth UPS 108(2), the other two UPSs may continue providing power to a load. In one embodiment, each of first UPS 106(1), second UPS 106(2), third UPS 108(1), and/or fourth UPS 108(2) may be a 500 kW output UPS. By way of example only, and not by way of limitation, one or more of first UPS 106(1), second UPS 106(2), third UPS 108(1), and/or fourth UPS 108(2) may be, but are not limited to single or double conversion, AC-AC, AC-DC-AC, DC-AC, rotary (flywheel, etc.), or the like.

In one embodiment, legacy load 112 is coupled to bus 102(4) by connection C9 and to bus 104(4) by connection C10. Legacy load 112 generally refers to single phase equipment that may be present in building 118. Legacy load 112 may be equipment that only supports a single power input, and will benefit from first UPS 106(1) and second UPS 108(1) that synchronize their output but not necessarily from all four UPSs 106(1), 106(2), 108(1), and 108(2). An example of such a load would be a typical monitor for a personal computer (PC). While servers may be designed with two or more power supplies that may be able to rectify totally unsynchronized loads, consumer and desktop equipment tends to have a single load. In this case, legacy load 112 may power building systems that only support a single input (e.g., Chiller or other heating, ventilation, and air conditioning (HVAC) component, etc.). This shows how power backup system 100 may be applied to existing buildings and designs with little or no modification to the components that don't need the protection. Likewise, ATSs 102(3) and 104(3) may be applied after each of respective first and second pairs of UPSs 106 and 108 to provide UPS power to those components that could benefit from the UPS protection. Legacy load 112 may include a three-phase sensing switch 112(1) to receive AC current or power from first power source 102 and second power source 104. Three phase sensing switch 112(1) may be for a utility to utility feed. Based upon sensed power received from first power source 102, second power source 104, or both, three-phase sensing switch 112(1) may drive legacy and single feed equipment 112(2) or other loads. The term "single feed" refers to loads that have only one input terminal, in contrast with dual feed equipment/devices, e.g., UPSs 106(1), 106(2), 108(1), and 108(2), which have at least two input inlets/terminals configured as primary feed and maintenance bypass feed, as described above. In one embodiment, legacy load 112 is optional in which case power backup system 100 will not include connections C9 and C10.

In one embodiment, loads 110(1) and 110(2) may each be servers in a datacenter, which further couple to individual computers (not shown) serviced by the data center. Although loads 110(1) and 110(2) have been shown as separate loads, in one embodiment, loads 110(1) and 110(2) may be a single load. Further examples of loads 110(1) and 110(2) may include additional downstream equipment, transformers, and the like, and the features and functionalities of the embodiments disclosed herein are not limited by the nature of loads 110(1) and 110(2). In an alternative embodiment, more than two loads may be present. In an alternative embodiment, a single server may support more than two power supplies and may connect to multiple power systems 100 as load 110(1) or 110(2) with respect to each system. Further, a load 110 may have two power inputs and draw as both loads 110(1) and 110(2) for higher reliability (e.g. a dual power supply computer server).

By way of example only, power backup system 100 is arranged to provide uninterrupted power to one or more of loads 110(1) and 110(2). In one example, power backup system 100 provides continuous uninterrupted power in an event of failure of one or more of power sources (e.g., first power source 102, second power source 104, or both). For example, in the example embodiment illustrated in FIG. 1, power backup system 100 has a total of four independent power sources—AC mains power source 102(1), AC mains power source 104(1), generator 114(1), and generator 114(2), although in other embodiments, power backup system 100 may have additional number of independent power sources. The arrangement of connections C1-C10 in power backup system 100 insures that as long as at least one of these four power sources is functioning, loads 110(1) and 110(2) will always have uninterrupted power supply through UPSs 106(1), 106(2), 108(1), and/or 108(2). By way of example only, and not by way of limitation, certain failure modes of power backup system 100 are discussed below.

In a first failure mode of power backup system 100, AC mains power source 102(1) fails or under performs (e.g., poor quality factor or change in amplitude, frequency, loss of a phase or a "leg," phase unbalance, etc.). In this mode, ATS 102(3) senses such abnormal conditions and directs power from generator 114(1) to bus 102(4). As a result, loads 110(1) and 110(2), as well as legacy load 112, if present, continue to receive power over respective connections C1-C10. Likewise, only a failure of generator 114(1), does not affect power backup system 100's capability to drive loads 110(1) and 110(2). Similar analysis for such a failure mode, where one of AC mains power source 104(1) or generator 114(2) fails or underperforms, may be carried out. For example, ATS 104(3) may sense abnormal conditions at AC mains power source 104(1), and accordingly may direct power from generator 114(2) to bus 104(4). As a result, loads 110(1) and 110(2), as well as legacy load 112, if present, continue to receive power over respective connections C1-C10. Likewise, only a failure of generator 114(2), does not affect power backup system 100's capability to drive loads 110(1) and 110(2).

In a second failure mode of power back system 100, first power source 102 as well as generator 114(1) may both fail. In this mode, there is no current or power output from bus 102(4), and therefore, connections C1, C3, C5, C7, and C9 are electrically dead. In one embodiment, "back feeding" via a manual switch or an active component may be used to provide power to C1, C3, C5, C7, and C9 from second power source 104 or generator 114(2), even though second power source 104 or generator 114(2) may be in a failed state. Such back feeding may be useful, for example, in testing the failed components of power back system 100. However, even with a total failure of first power source 102 and generator 114(1), loads 110(1) and 110(2) receive power from second power source 104 and/or generator 114(2). For example, in this failure mode, first primary feed 106(11) does not receive any power over connection C1. However, first maintenance bypass feed 106(12) receives power from second power source 104 over connection C2. As a result, output to load 110(1) from first UPS 106(1) is maintained. Likewise, second primary feed 106(21) of second UPS 106(2) connected to second power source 104 by connection C4 is unaffected by the failure of first power source 102, and continues outputting power to load 110(1). However, second maintenance feed 106(22) connected to and receiving power from first power source 102 over connection C3 does not receive any electrical power when first power source 102 as well as generator 114(1) both fail.

Similarly, in the second failure mode, although third primary feed 108(11) of third UPS 108(1) does not receive any electrical power from first power source 102 and generator 114(1) over connection C5, and fourth maintenance bypass feed 108(22) of fourth UPS 108(2) does not receive any electrical power from first power source 102 over connection C7, as illustrated in FIG. 1, third maintenance bypass feed 108(12) of third UPS 108(1) and fourth primary feed 108(21) of fourth UPS 108(2) continue to receive power from second power source 104 or generator 114(2) and therefore, can drive load 110(2) with no disruption resulting from failure of first power source 102 and generator 114(1). In addition, in the second failure mode, legacy load 112 still receives power from second power source 104 over connection C10.

In a third failure mode, second power source 104 as well as generator 114(2) may both fail. In this mode there is no current or power output from bus 104(4), and therefore, connections C2, C4, C6, C8, and C10 are electrically dead. However, even with a total failure of second power source 104 and generator 114(2), loads 110(1) and 110(2) receive power from first power source 102 and/or generator 114(1). For example, in this failure mode, second primary feed 106(21) of UPS 106(2) does not receive any power from second power source 104 and/or generator 114(2) over connection C4. Similarly, first maintenance bypass feed 106(12) of UPS 106(1) does not receive any power from second power source 104 and/or generator 114(2) over connection C2. However, first primary feed 106(11) and second maintenance bypass feed 106(22) receive power from first power source 102 over connections C1 and C3, respectively. As a result, output to load 110(1) from first UPS 106(1) is maintained.

Similarly, in the third failure mode, although third maintenance bypass feed 108(12) of third UPS 108(1) does not receive any electrical power from second power source 104 and generator 114(2) over connection C6, and fourth primary feed 108(21) of fourth UPS 108(2) does not receive any electrical power from second power source 104 over connection C8, as illustrated in FIG. 1. However, third primary feed 108(11) of third UPS 108(1) and fourth maintenance bypass feed 108(22) of fourth UPS 108(2) continue to receive power from first power source 102 or generator 114(1) over connections C5 and C7, respectively, and therefore, can drive load 110(2) with no disruption resulting from failure of second power source 104 and generator 114(2). In addition, in the third failure mode, legacy load 112 still receives power from first power source 102 over connection C9.

In a fourth failure mode, only generator 114(1) may be functioning, and AC mains power source 102(1), AC mains power source 104(1), and generator 114(2) may be out of service. In this failure mode, connections C1, C3, C5, C7, and C9 are active or live since bus 102(4) outputs electrical power from generator 114(1) at these terminals. As a result, even with a failure of AC mains power source 102(1), AC mains power source 104(1), and generator 114(2), loads 110(1), 110(2) and legacy load 112 still receive power. The potential lack of synchronization of generator 114(1) and AC mains power source 102(1) does not affect power backup system 100's ability to drive loads 110(1) and 110(2) because first UPS 106(1) and second UPS 106(2), and third UPS 108(1) and fourth UPS 108(2) may digitally synchronize.

In a fifth failure mode, only generator 114(2) may be functioning, and AC mains power source 102(1), AC mains power source 104(1), and generator 114(1) may be out of service. In this failure mode, connections C2, C4, C6, C8, and C10 are active or live since bus 104(4) outputs electrical power from generator 114(2) at these terminals. As a result, even with a failure of AC mains power source 102(1), AC mains power source 104(1), and generator 114(1), loads 110(1), 110(2) and legacy load 112 still receive power.

It is to be noted that the failure modes described above are by way of example only, and not by way of limitation. One of ordinary skill in the art reading this disclosure may contemplate other failure modes that may be one or more combinations of the failure modes described above. For example, even if one of the UPSs in a pair of UPSs fail or underperform, the other UPS in the pair will continue to power the load.

In one embodiment, only one of first pair of UPSs 106 or second pair of UPSs 108 may be provided to power a load (e.g., load 110(1)). The failure modes described above, or combinations thereof would still apply and uninterrupted power to the load is still achieved even with only one pair of UPSs. For example, even with different failure modes, UPSs 106(1) and 106(2) will continue to receive power from at least one of AC mains power source 102(1), AC mains power source 104(1), generator 114(1), and generator 114(1). Further, in one embodiment, when a primary feed of any UPS is not receiving power, that UPS may initially rely on a battery included therein to provide power to a load (e.g., load 110(1)), and then gracefully transfer power to the load from its maintenance bypass feed. Such graceful transfer may be controlled by a controller (not shown) having a processor and a memory coupled to each other by an internal bus inside the UPS.

In one embodiment, additional UPSs may be provided. For example, a third pair or set of UPSs (not shown) may be provided where primary feeds of each UPS in the third pair may be connected to different independent power sources, and likewise the maintenance bypass feeds of each UPS in the third pair may be connected to different independent power sources. That is, a primary feed of a UPS in the third pair of UPSs may share a power source (e.g., power source 102 or generator 114(1)) with a maintenance bypass feed of the other UPS. Likewise, the maintenance bypass feed of the first UPS in the third pair of UPSs may share a common power source with the primary feed of the second UPS in the third pair of UPSs. As a result, the failure mode analysis described above may similarly be extended to any number of UPS pairs or sets, in the manner of connections described above.

Figure 2:
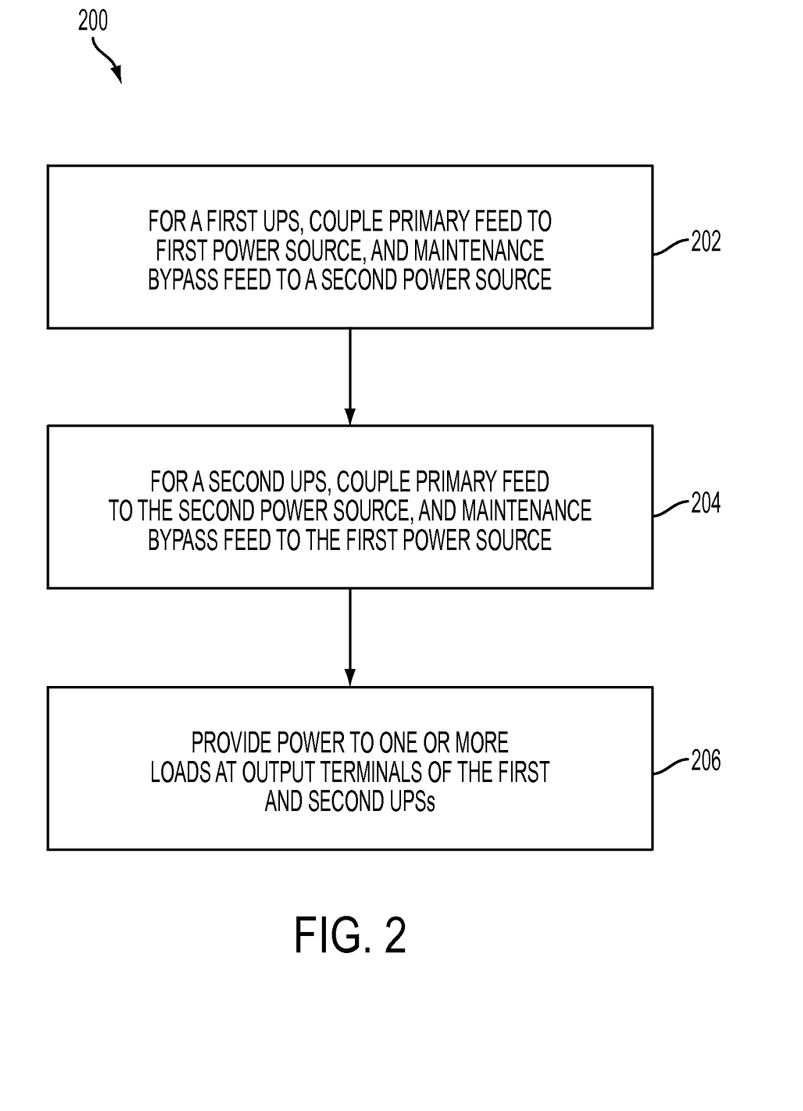
FIG. 2 illustrates a flowchart for a method for providing power backup, in accordance with an embodiment.

FIG. 2 illustrates a flowchart of a method 200 for providing power backup, using for example, power backup system 100.

Method 200 may begin at a process 202 where a primary feed of a first UPS (e.g., first UPS 106(1)) is directly coupled to a first power source (e.g., AC mains source 102(1) and/or generator 114(1)), and a maintenance bypass feed is directly coupled to a second power source (e.g., AC mains source 104(1) and/or generator 114(2)). Such direct coupling may include coupling without any active components (e.g., active switches). The first and second power sources are independent power sources and may provide unsynchronized power.

Alternatively, the first and second power sources may provide synchronized power even though they may be independent sources of power.

At a process 204, a primary feed of a second UPS (e.g., second UPS 106(1)) is directly coupled to the second power source (e.g., AC mains source 104(1) and/or generator 114 (2)), and a maintenance bypass feed is directly coupled to the first power source (e.g., AC mains source 102(1) and/or generator 114(1)). The couplings are made such that the primary feed of the second UPS is coupled to a power source different from the power source coupled to the primary feed of the first UPS. Likewise, the couplings are made such that the maintenance bypass feed of the second UPS is coupled to a power source different from the power source coupled to the maintenance bypass feed of the first UPS.

At a process 206, the first and the second UPSs provide uninterrupted power supply to one or more loads connected in parallel at respective outlets of the first and the second UPSs. Such providing of power to the one or more loads is carried out such that, such that failure of one of the power sources does not affect the output of the first and the second UPSs. In one embodiment, the output from the two UPSs is digitally synchronized to drive the one or more loads.

It is to be noted that specific order of processes 202-206 described above is by way of example only and not by way of limitation. For example, some processes may be carried out before, or in parallel with other processes. Further, two or more processes may be combined into one without departing from the scope of method 200. Alternatively or additionally, one or more processes may be optional depending upon specific features and functionalities desired. For example, optionally, additional UPSs (e.g., second pair of UPSs 108) may be coupled to independent power sources in a manner similar to that described for first and second UPSs in processes 202 and 204 above, and illustrated by way of example only in FIG. 1.

Figure 3:
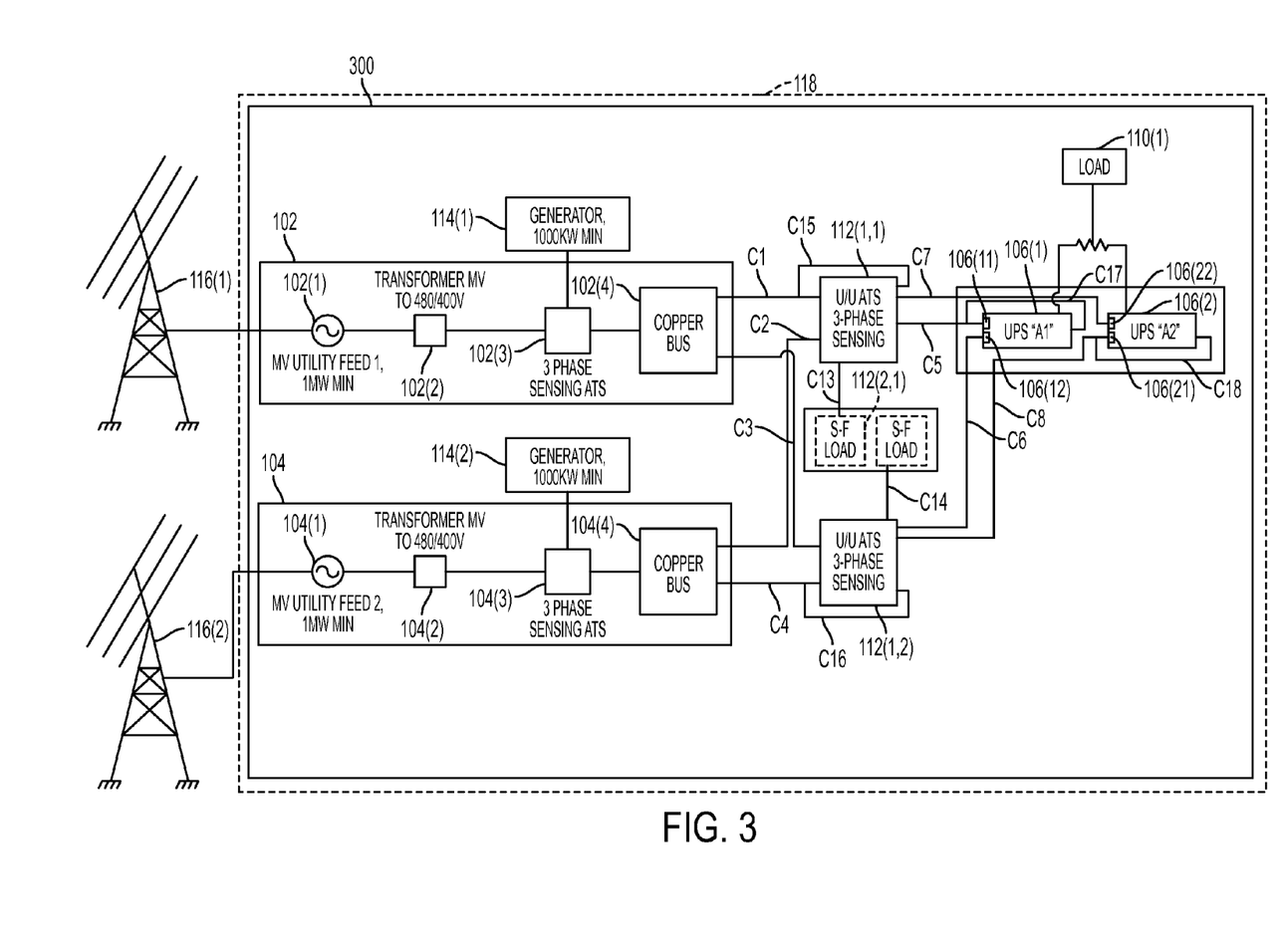
FIG. 3 illustrates a schematic block diagram of a power backup system, in accordance with another embodiment.

FIG. 3 provides a schematic block diagram of an exemplary embodiment of a power backup system 300 which may include one or more components similar (in construction and/or functionality) to those described above for power backup system 100 (illustrated in FIG. 1). As such, components of system 300 (illustrated in FIG. 3) which are similar to those in system 100 are referred to using the same labels or referral numerals as in FIG. 1. Power backup system 300 may include first power source 102, second power source 104, a pair or set of uninterruptible power supplies 106, load 110(1), a first three-phase sensing switch 112(1,1), a second three-phase sensing switch 112(1,2), a first legacy and single feed load 112(2,1), a second legacy and single feed load 112(2,2), first generator 114(1), and second generator 114(2), although power backup system 100 may include more or lesser number of components. Switches 112(1, 1), 112(1, 2) may be similar to three-phase sensing switch 112(1) and loads 112(2, 1), 112 (2, 2) may be similar to load 112(2) described above with regard to system 100. Further, although only one pair or set of supplies 106 are shown, system 300 may include multiple pairs or sets of of uninterruptible power supplies 106 (or uninterruptible power supplies 108 illustrated in and described above with respect to FIG. 1).

In one embodiment, power backup system 300 includes only first pair of uninterruptible power supplies 106 without second pair of uninterruptible power supplies 108 or more than two pairs of uninterruptible power supplies, only one load or three or more loads, only one three-phase sensing switch 112(1) or three or more three-phase sensing switches 112(1), only one load 112(2) or three or more loads 112(2). Power backup system 300 may include connections C1-C4 that electrically couple first power source 102 and second power source 104 to first switch 112(1,1) and second switch 112(1,2) in the exemplary manner illustrated in FIG. 3. In one embodiment, switches 112(1,1), 112(1,2) are both directly connected to power sources 102, 104, i.e., without an active component in-between. Further, first and second switches 112(1,1), 112(1,2) may be electrically coupled to the pair of uninterruptible power supplies 106 via connections C5-C8 as illustrated in FIG. 3. In addition, first and second switches 112(1,1), 112(1,2) may be electrically coupled to single-feed loads 112(2,1), 112(2,2) via connections C13, C14, respectively. In one embodiment, switches 112(1,1), 112(1,2) each includes an external maintenance bypass connection in which an input of the switch is connected to an output of the switch, e.g., via connections C15 or C16 illustrated in FIG. 3. Generally, switches 112(1,1), 112(1,2) may include a manual maintenance bypass, a service entrance disconnect (or another overcurrent device). Similarly, UPSs 106 include an external maintenance bypass connection in which an input of the UPS is connected to an output of the UPS, e.g., via connections C17, C18 illustrated in FIG. 3.

Similar to system 100, system 300 may also include generator 114(1) coupled to first power source 102 and generator 114(2) coupled to second power source 104. Electrical power provided by power source 102, power source 104, or both is used by pair of uninterruptible power supplies 106, and generators 114(1) or 114(2), or both, to drive one or more loads, e.g., load 110(1) coupled at respective output terminals (not shown) of pair of uninterruptible power supplies 106. The features and functionalities of power backup system 300 may be achieved using fewer or higher number of components than those disclosed herein. For example, one or more of connections C1-C8, C13-C18 may similar to the connections of system 100, e.g., the connections of system 300 may be routed via passive components, e.g., circuit breakers or fuses. The specific arrangement of components shown in power backup system 300 of FIG. 3 is by way of example only, and not by way of limitation. Also, one or more generators may be coupled as 114 for example, a 2 MW generator may feed two 1 MW capacity switches 102 or conversely, two 600 KW generator fees may be synchronized to feed a single 1 MW 102. Power backup system 300 may be located (partially or fully) inside or outside building 118, e.g., a data center. For example, first and second power sources 102 and 104 may be located outside building 118, and first and second pair of uninterruptible power supplies 106 and 108 may be located inside building 118. Accordingly, various embodiments described herein are not limited by specific location of components of power backup system 300, and the arrangement illustrated in FIG. 3 is by way of example only.

Second power source 104 may be independent of or dependent upon first power source 102 for power. In one embodiment, first power source 102 and/or second power source 104 may allow for "net-metering" and/or "peak shaving", or may be in a co-generation mode, as described above for system 100. Further, ATS 102(3) and ATS 104(3) may be three-phase sensing switches or single-phase sensing switches, and may have same configurations, capabilities, and functionalities are described with respect to system 100.

In some embodiments, an output of ATS 102(3) is coupled to bus 102(4). Bus 102(4) outputs power from first power source 102 via one or more connections (e.g., connections C1, C3) to first switch 112(1,1) and second switch 112(1,2). Similarly, an output of ATS 104(3) is coupled to bus 104(4). Bus 104(4) outputs power from second power source 104 via one or more connections (e.g., connections C2, C4) to first switch 112(1,1) and second switch 112(1,2). In one embodiment, buses 102(4) and 104(4) are copper buses, and are passive devices, although other types of buses known to one of ordinary skill in the art may be used. Generally, buses 102(4) and 104(4) may be constructed as a wire trough, or a bus duct or similar passive arrangement with or without service interruption and/or overcurrent protection. Further, buses 102(4) and 104(4) may be defined based on the local electrical code. In another embodiment, system 300 may not include any copper bus, and as such, ATS 102(3), 104(3) may be connected directly to ATS 112(1,1), 112(1,2).

The output power from ATS 112(1,1) and ATS 112(1,2) is provided to connections C5-C8, respectively, as illustrated in FIG. 3. Although only four output connections C5-C8 are illustrated, higher or lower number of output connections from ATS 112(1,1) and ATS 112(1,2) may be present depending upon specific applications for which output power from AC mains power source 102(1) and AC mains power source 104(1) is to be used, as may be contemplated by one of ordinary skill in the art after reading this disclosure. For example, in one embodiment, connections C5 and C7 from ATS 112(1,1), and connections C6 and C8 from ATS 112(1,2) connect to and provide power to first pair of uninterruptible power supplies 106.

Uninterruptible power supplies 106 include a first uninterrupted power supply (UPS) 106(1) and a second UPS 106(2). UPS 106 may have similar configuration, construction and functionalities as described above with regard to system 100 in FIG. 1. For example, UPS 106(1), 106(2) may be configured to rectify alternating current (AC) to direct current to drive load 110(1). In one embodiment, regardless of whether the input currents to UPS pair 106 are synchronized or unsynchronized, UPS 106(1) and UPS 106(2) provide a digitally synchronized output current to drive load 110(1). It is to be noted that although each of UPS 106 is illustrated to include two UPS, UPS 106 may include a higher number of UPSs.

In one embodiment, first UPS 106(1) has a first primary feed 106(11) at a first input inlet thereof, and a first maintenance bypass feed 106(12) at a second input inlet thereof. First primary feed 106(11) is coupled directly to ATS 112(1, 1) by connection C5 to receive AC current or power from first power source 102 (e.g., from AC mains power source 102(1) or generator 114(1)) at the first input inlet/terminal of UPS 106(1). First maintenance bypass feed 106(12) is coupled directly to ATS 112(1,2) by connection C6 to receive AC current or power from second power source 104 (e.g., from AC mains power source 104(1) or generator 114(2)) at the second input inlet/terminal of UPS 106(1).

In one embodiment, second UPS 106(2) has a second primary feed 106(21) at a first input inlet thereof, and a second maintenance bypass feed 106(22) at a second input inlet thereof. Second primary feed 106(21) is coupled to ATS 112(1,2) by connection C8 to receive AC current or power from second power source 104 (e.g., from AC mains power source 104(1) or generator 114(2)) at the first input inlet/ terminal of UPS 106(2). Second maintenance bypass feed 106(22) is coupled directly to ATS 112(1,1) by connection C7 to receive AC current or power from first power source 102 (e.g., from AC mains power source 102(1) or generator 114 (1)) at the second input inlet/terminal of UPS 106(2). In one embodiment, the direct connections C5-C8 between ATS 112 and UPS 106 may include passive components in between (e.g., fuses, circuit breakers, breaker panels, etc.) with no substantial active components for switching between ATS 112(1,1) and 112(1,2). An output of second UPS 106(2) is connected to load 110(1) with standard impedance matching circuitry in-between (not shown) to drive load 110(1) in parallel with output from first UPS 106(1). In one embodiment, these outputs from first UPS 106(1) and second UPS 106(2) are synchronized (e.g., digitally synchronized).

In one embodiment, ATS 112(1,1) is electrically coupled (via connection C13) to provide power and drive single-feed load 112(2,1) and ATS 112(1,2) is electrically coupled (via connection C14) to and drive single-feed load 112(2,2). Loads 112(2,1), 112(2,2) may include a personal computer (PC), computer servers, chiller or heating equipment, ventilation, and air conditioning (HVAC) component, etc.

In one embodiment, upon a failure of any two UPSs out of first UPS 106(1), second UPS 106(2), the other two UPSs may continue providing power to a load. In one embodiment, each of first UPS 106(1) and/or second UPS 106(2) may be a 500 kW output UPS. By way of example only, and not by way of limitation, first UPS 106(1) and/or second UPS 106(2) may be, but are not limited to, a UPS with single or double conversion, AC-AC, AC-DC-AC, DC-AC, rotary (flywheel, etc.), or the like.

By way of example only, power backup system 300 is arranged to provide uninterrupted power to one or more of loads 110(1) and 110(2). In one example, power backup system 300 provides continuous uninterrupted power in an event of failure of one or more of power sources (e.g., first power source 102, second power source 104, or both). For example, in the example embodiment illustrated in FIG. 3, power backup system 300 has a total of four independent power sources—AC mains power source 102(1), AC mains power source 104(1), generator 114(1), and generator 114(2), although in other embodiments, power backup system 100 may have additional number of independent power sources. The arrangement of connections C1-C8 in power backup system 300 insures that as long as at least one of these four power sources is functioning, loads 110 will always have uninterrupted power supply through UPSs 106(1) and/or 106 (2) (and/or additional UPSs). Further, system 300 may be configured to handle one or more failure modes described above to provide continuous power to loads 110 (and/or loads 112) in the manner similar to that discussed above with respect to system 100.

In one embodiment, ATS 112(1,1) has an external maintenance bypass connection in which an input of ATS 112(1,1) (e.g., the input connected to power source 102) is connected to one of its output, as illustrated by connection C15. Similarly, ATS 112(1,2) may have an external maintenance bypass connection in which an input of ATS 112(1,2) (e.g., the input connected to power source 104) is connected to one of its output, as illustrated by connection C16. Such external maintenance bypass connection may include an interlock of multiple circuit breakers, and may be used for removal or replacement of malfunctioning, non-functioning or obsolete ATS 112(1,1) or 112(1,2) without any disruption of power provided to loads 110, 112. Although not shown, such external maintenance bypass connection may also be used for ATS 102(3) and/or ATS 104(3).

In one embodiment, UPS 106(1) and UPS 106(2) each has a respective external maintenance bypass connection in which an input of UPS (e.g., the primary feed of the UPS) is connected to one of its output, as illustrated by connections C17, C18. Such external maintenance bypass connection may include an interlock of multiple circuit breakers, and may be used for removal or replacement of malfunctioning, non-functioning or obsolete UPS 106 without any disruption of power provided to loads 110, 112.

Figure 4:
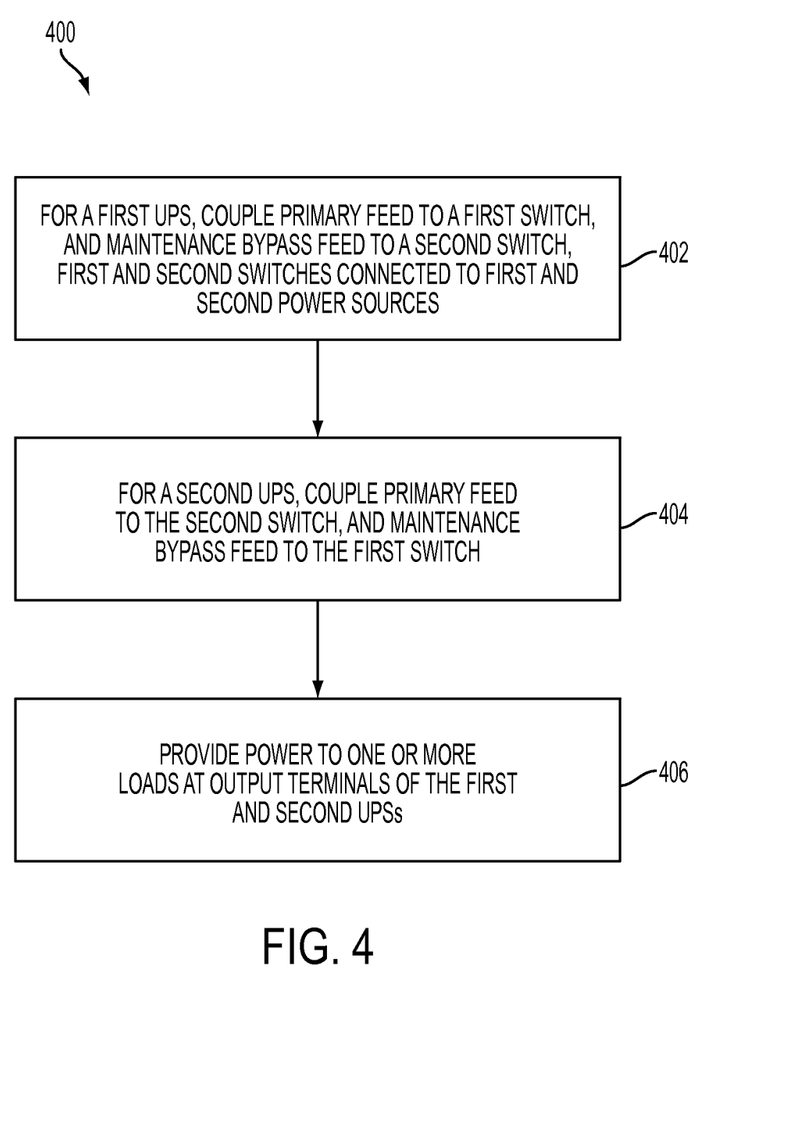
FIG. 4 illustrates a flowchart for a method for providing power backup, in accordance with another embodiment.

FIG. 4 illustrates a flowchart of a method 400 for providing power backup, using for example, power backup system 300.

Method 400 may begin at a process 402 where a primary feed of a first UPS (e.g., first UPS 106(1)) is coupled to a first switch (e.g., ATS 112(1,1)) and a maintenance bypass feed is coupled to a second switch (e.g., ATS 112(1,2)). ATS 112(1,1) and ATS 112(1,2) may be directly coupled with first and second power sources 102, 104 as discussed above with regard to FIG. 3. The first and second power sources are independent power sources and may provide unsynchronized power. Alternatively, the first and second power sources may provide synchronized power even though they may be independent sources of power.

At a process 404, a primary feed of a second UPS (e.g., second UPS 106(2)) is coupled to the second power source (e.g., ATS 112(1,2)), and a maintenance bypass feed is directly coupled to the first power source (e.g., ATS 112(1,1)). The couplings are made such that the primary feed of the second UPS is coupled to a power source different from the power source coupled to the primary feed of the first UPS. Likewise, the couplings are made such that the maintenance bypass feed of the second UPS is coupled to a power source different from the power source coupled to the maintenance bypass feed of the first UPS.

At a process 406, the first and the second UPSs provide uninterrupted power supply to one or more loads connected in parallel at respective outlets of the first and the second UPSs. Such providing of power to the one or more loads is carried out such that, such that failure of one of the power sources does not affect the output of the first and the second UPSs. In one embodiment, the output from the two UPSs is digitally synchronized to drive the one or more loads.

It is to be noted that specific order of processes 402-406 described above is by way of example only and not by way of limitation. For example, some processes may be carried out before, or in parallel with other processes. Further, two or more processes may be combined into one without departing from the scope of method 400. Alternatively or additionally, one or more processes may be optional depending upon specific features and functionalities desired. For example, optionally, additional UPSs (e.g., second pair of UPSs 108) may be coupled to independent power sources via switches 112 in a manner similar to that described for first and second UPSs in processes 402 and 404 above, and illustrated by way of example only in FIG. 3.

By way of example only and not by way of limitation, various embodiments described herein advantageously provide synchronized power to one or more loads, e.g., servers in a data center, independent of whether first power source 102 and second power source 104 are synchronized or unsynchronized. The embodiments described herein provide uninterrupted power without having a single point of failure in the power train with substantially 99% energy efficiency. In one implementation, no motorized breaches or panel boards are used between first power source 102, second power source 104, generators 114(1) and 114(2) and first and second pair of UPSs 106 and 108, although the from first UPS 106(1), second UPS 106(2), third UPS 108(1), and/or fourth UPS 108(2) individually may have static transfer switches inside them. Likewise, in one embodiment, switching between first power source 102 and second power source 104 to provide power to first and second pairs of UPSs 106 and 108 may be contactless. Yet another exemplary advantage of various embodiments described herein is that component costs are reduced by up to 70% as compared to active switch implementations. Furthermore, loss of synchronization between first AC mains power source 102(1) and generator 114(1), and/or second AC mains power source 104(1) and generator 114(2), e.g., in an emergency, does not impact the downstream load. Power backup system 100 is scalable linearly for additional power sources and UPSs, with no complex costs associated with centrally controlled components that have to be upsized. Additionally, in one embodiment, the lengths of the conductors between components may be significantly reduced to reduce resistive loads and further increase efficiency; these are in part enhanced through the increased use of passive components.

In one embodiment, combinations of power delivery mechanisms may be utilized to output power from first UPS 106(1), second UPS 106(2), third UPS 108(1), and/or fourth UPS 108(2). For example, power may be shared between any pair of UPSs, e.g., first UPS 106(1) and second UPS 106(2). Alternatively, loads 110(1) and/or 110(2) may independently receive power from first UPS 106(1), second UPS 106(2), third UPS 108(1), and/or fourth UPS 108(2). Still alternatively, power from one power outlet of first UPS 106(1), second UPS 106(2), third UPS 108(1), and/or fourth UPS 108(2) can provide power to dual power servers or other loads. In one embodiment, power backup system 100, and specifically first pair of UPSs 106 and/or second pair of UPSs 108 is configured to provide power outputs of 1 MW to 100 MW, although other higher or lower values of power output may be achieved using other number of UPSs (or different sizes of UPSs).

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

What is claimed is:

1. A power backup system, comprising:
a first uninterruptible power supply and a second uninterruptible power supply configured to drive a load in parallel, wherein the first uninterruptible power supply and the second uninterruptible power supply are both connected to at least two power sources, a connection to a first of the at least two power sources being through a single first switch.

2. The power backup system of claim 1, wherein the first uninterruptible power supply and the second uninterruptible power supply are both further connected to a second of the at least two power sources through a single second switch.

3. The power backup system of claim 2, wherein the first switch, the second switch, or both are electrically connected to the at least two power sources directly through a direct connection without an active component in-between.

4. The power backup system of claim 2, wherein at least one of the first switch and the second switch is a three-phase sensing switch.

5. The power backup system of claim 2, wherein the first uninterruptible power supply and the second uninterruptible power supply each comprise a primary feed and a maintenance bypass feed, wherein the primary feed of the first uninterruptible power supply and the primary feed of the second uninterruptible power supply are connected to different switches, and wherein the maintenance bypass feed of the first uninterruptible power supply and the maintenance bypass feed of the second uninterruptible power supply are connected to different switches.

6. The power backup system of claim 5, wherein the primary feed of the first uninterruptible power supply and the maintenance bypass feed of the second uninterruptible power supply are both connected to the first switch, and wherein the primary feed of the second uninterruptible power supply and the maintenance bypass feed of the first uninterruptible power supply are both connected to the second switch.

7. The power backup system of claim 5, wherein the first uninterruptible power supply comprises an external maintenance bypass connection in which the primary feed of the first uninterruptible power supply is connected to an output of the first uninterruptible power supply, or the second uninterruptible power supply comprises an external maintenance bypass connection in which the primary feed of the second uninterruptible power supply is connected to an output of the second uninterruptible power supply.

8. The power backup system of claim 2, wherein the first switch, the second switch or both are directly connected to a single-feed load.

9. The power backup system of claim 8, wherein the single-fed load comprises a plurality of single-feed equipment, and
wherein the first switch is configured to provide power from the at least two power sources to a first portion of the plurality of single-feed equipment, and wherein the second switch is configured to provide power from the at least two power sources to a second portion of the plurality of single-feed equipment, the first portion of the plurality of single-feed equipment being different than the second portion of the plurality of single-feed equipment.

10. The power backup system of claim 2, wherein the first switch comprises an external maintenance bypass connection in which an input of the first switch is connected to an output of the first switch, or the second switch comprises an external maintenance bypass connection in which an input of the second switch is connected to an output of the second switch.

11. The power backup system of claim 1, wherein the first uninterruptible power supply and/or the second uninterruptible power supply are configured to switch between power from the at least two power sources, each of the at least two power sources comprising at least one of a generator and an interface to mains power.

12. The power backup system of claim 1, wherein the at least two power sources are mutually synchronized.

13. The power backup system of claim 1, wherein the at least two power sources are independent power sources, and wherein in an event of failure of one of the at least two power sources, the load receives power from the other power source that did not fail.

14. A method for providing power backup, comprising:
coupling at least two uninterrupted power supplies (UPSs) to at least two independent power sources through a single first switch such that each of the at least two UPSs receives power from the at least two independent power sources; and
providing from the at least two UPSs, uninterrupted power to a load connected in parallel to the at least two UPSs, wherein upon a failure of one of the at least two independent power sources, the other power source continues supplying power to the at least two UPSs for the providing.

15. The method of claim 14, wherein the coupling further comprises coupling the at least two UPSs to the at least two independent power sources through a single second switch.

16. The method of claim 15, wherein the first switch or the second switch is a three-phase sensing switch connected directly without an active component to the at least two power sources, each of the at least two power sources comprising at least one of a generator and an interface to mains power.

17. The method of claim 15, wherein the at least two UPSs comprise a first UPS and a second UPS, such that the first UPS comprises a first primary feed and a first maintenance bypass feed and the second UPS comprises a second primary feed and a second maintenance bypass feed, and wherein the coupling comprises:
coupling the first primary feed and the second maintenance bypass feed to the first switch; and
coupling the second primary feed and the first maintenance bypass feed to the second switch.

* * * * *